United States Patent
Hu et al.

(10) Patent No.: US 11,112,903 B2
(45) Date of Patent: Sep. 7, 2021

(54) DISPLAY DEVICE

(71) Applicant: AU Optronics Corporation, Hsin-Chu (TW)

(72) Inventors: Hsin-Lin Hu, Hsin-Chu (TW); Jui-Chi Lo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/068,854

(22) Filed: Oct. 13, 2020

(65) Prior Publication Data

US 2021/0208722 A1  Jul. 8, 2021

(30) Foreign Application Priority Data

Jan. 6, 2020  (TW) ................................ 109100369

(51) Int. Cl.
  *G06F 3/041*  (2006.01)
  *G06K 9/00*  (2006.01)

(52) U.S. Cl.
  CPC ....... *G06F 3/0416* (2013.01); *G06K 9/00013* (2013.01)

(58) Field of Classification Search
  None
  See application file for complete search history.

(56) References Cited

U.S. PATENT DOCUMENTS

| 2012/0105081 | A1* | 5/2012 | Shaikh | G06K 9/0002 324/686 |
| 2017/0024602 | A1* | 1/2017 | Han | G06F 3/0445 |
| 2017/0344787 | A1* | 11/2017 | Cho | G06F 3/04886 |
| 2018/0330653 | A1 | 11/2018 | Zhou | |

FOREIGN PATENT DOCUMENTS

| CN | 107065336 A | 8/2017 |
| CN | 107300793 A | 10/2017 |
| CN | 108875634 A | 11/2018 |

\* cited by examiner

*Primary Examiner* — Nicholas J Lee (74) *Attorney, Agent, or Firm* — WPAT, PC (57) ABSTRACT

A display device includes an active display array, an optical sensor array, a first driving circuit, a second driving circuit, and a third driving circuit. The active display array includes a number of scan lines. The first driving circuit is coupled to a first portion of the scan lines through a first metal layer. The second driving circuit is coupled to a second portion of the scan lines through the first metal layer. The third driving circuit is disposed between the first driving circuit and the second driving circuit and is coupled to the optical sensor through a second metal layer. The second metal layer is different from the first metal layer.

9 Claims, 5 Drawing Sheets

DISPLAY DEVICE

CROSS-REFERENCE TO RELATED APPLICATION

This application claims priority to Taiwan Application Serial Number 109100369, filed Jan. 6, 2020, which is herein incorporated by reference in its entirety.

BACKGROUND

Field of Invention

The present disclosure relates to a display device. More particularly, the present disclosure relates to a touch display device with narrow bezel.

Description of Related Art

With the advancement of display device technology, most of display devices have touch function, and even have other sensors such as fingerprint sensor and pressure sensor in recent year. However, in order to drive the sensors, the number of driving circuits required in the display device must be increased accordingly, thereby increasing the frame area of the display device, and also wasting unused frame area because of the parallel arrangement of the driving circuits, which may not achieve the narrow bezel display device required by consumers.

SUMMARY

To solve above problems, the invention provides a display device which includes an active display array, an optical sensor array, a first driving circuit, a second driving circuit, and a third driving circuit. The active display array includes a plurality of scan lines. The optical sensor array overlaps the active display array. The first driving circuit is coupled to a first portion of the scan lines through a first metal layer. The second driving circuit is coupled to a second portion of the scan lines through the first metal layer. The third driving circuit is disposed between the first driving circuit and the second driving circuit and is coupled to the optical sensor through a second metal layer, wherein the second metal layer is different from the first metal layer.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The term "coupled" or" connected" as used herein refers to two or more elements or devices that physically contact to each other directly or indirectly, it may also refer to two or more elements or devices operate each other.

The term "comprise", "include", "have", "has", "contain", and the like is inclusive or open-ended and does not exclude additional, unrecited elements or method steps.

The terms as used herein shall generally have the ordinary meaning as commonly understood by those of ordinary skill in the art, in the context of this document, and in the particular context. Certain terms used to describe the disclosure are discussed below or elsewhere in this specification to provide additional guidance to those of ordinary skill in the art in describing the disclosure.

Figure 1:
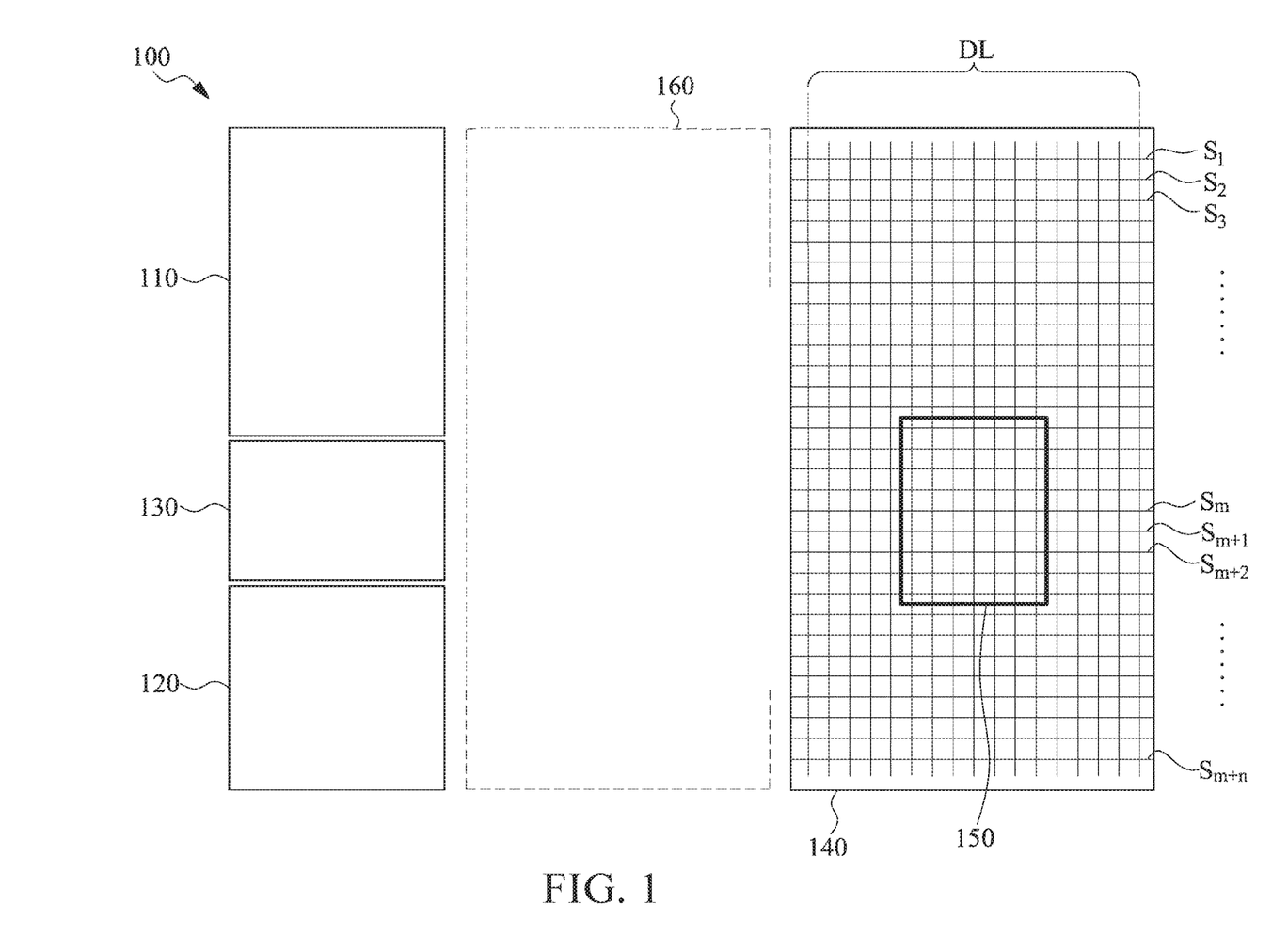
FIG. 1 is a schematic view of the display device according to some embodiments of the present disclosure.

Reference is made to FIG. 1. FIG. 1 is a schematic view of the display device according to some embodiments of the present disclosure. The display device 100 includes a first driving circuit 110, a second driving circuit 120, a third driving circuit 130, an active display array 140, an optical sensor array 150, and a connecting line 160.

In some embodiments, the active display array 140 can be used as a display panel for displaying images. In some embodiments, optical sensor array 150 may be a fingerprint sensor for sensing a fingerprint pressed by a user on the display device 100. In this embodiments, a position of the optical sensor array 150 overlaps a position of the active display array 140. In other words, the active display array 140 for displaying and the optical sensor array 150 for detecting fingerprint are integrated instead of providing a fingerprint sensor on the display device 100 that occupies an additional area (outside the active display array 140) so that the user can directly press the fingerprint at the position of the display panel of the display device 100 (in the area where the optical sensor array 150 is disposed) for identification, digital payment confirmation, or other operations related to the biometric features.

As shown in FIG. 1, an area of the optical sensor array 150 is smaller than an area of the active display array 140. When the active display array 140 is used as a display panel of a handheld device (e.g., a smart phone), the active display array 140 may be a vertical rectangle, and the optical sensor array 150 overlaps the active display array 140. The optical sensor array 150 can be disposed in a local area which locates in the center of the active display array 140, and is close to a bottom side of the active display array 140. For example, the optical sensor array 150 may overlap an upper layer or a lower layer of the active display array 140. In one embodiment, the optical sensor array 150 is disposed only in the local area of the active display array 140, which helps to save the manufacturing cost and reduce the difficulty of laying the transmission lines. How to integrate the active display array 140 and the optical sensor array 150 will be further described in the following paragraphs.

The position of the optical sensor array 150 is set mainly determining by the position where the user can easily press during operation. In some embodiments, when the user holds the display device 100, the holding position is usually in a downward position, the optical sensor array 150 for sensing fingerprints is thereby provided at the lower position of the active display array 140 for the convenience of the user.

In other words, if take a center line, which divides the optical sensor array 150 into an upper part and a lower part equally, as a boundary, the active display array 140 includes m scan lines $S_1$~$S_m$ above the center line, and the active display array 140 includes n scan lines $S_{m+1}$~$S_{m+n}$ below the center line, wherein m is greater than n.

In some embodiments, the active display array 140 includes a plurality of data lines DL and m+n scan lines $S_1$~$S_{m+n}$ which are substantially perpendicular to the data line DL. The scan lines $S_1$~$S_{m+n}$ are used for receiving a data signal transmitted by a driving circuit. In some embodiments, the first driving circuit 110 and the second driving circuit 120 are display driving circuits which are configured to drive the active display array 140. For example, the first driving circuit 110 and the second driving circuit 120 are gate driving circuit, the first driving circuit 110 generates m gate signals for driving the active display array 140, and transmits the gate signals to the m scan lines $S_1$~$S_m$ through the connecting line 160, wherein the m scan lines $S_1$~$S_m$ locate at the top side of the active display array 140. The second driving circuit 120 generates n gate signals for driving the active display array 140, and transmits the gate signals to the n scan lines $S_{m+1}$~$S_{m+n}$ through the connecting line 160, wherein the n scan lines $S_{m+1}$~$S_{m+n}$ locate at the bottom side of the active display array 140.

In some embodiments, when the optical sensor array 150 is the fingerprint sensor, the third driving circuit 130 is a fingerprint sensor driving circuit, and generates signals for driving the optical sensor array 150. In some application examples, although the frame width can be reduced by overlapping the display driving circuit (e.g., the first driving circuit 110 and the second driving circuit 120) and the fingerprint sensor driving circuit (e.g., the third driving circuit 130) at different levels, more vertical layers will be occupied at the same time, which may cause the overall thickness of the display touch panel to become thicker and increase the manufacturing cost. In other examples, the fingerprint sensor driving circuit may be arranged between the active display array and the gate driving circuit, or be arranged outside the gate driving circuit. In these practices, setting the fingerprint sensor driving circuit requires a certain width which increases the horizontal frame width of the display device 100, and is difficult to meet the design requirements of super narrow bezel.

Figure 2:
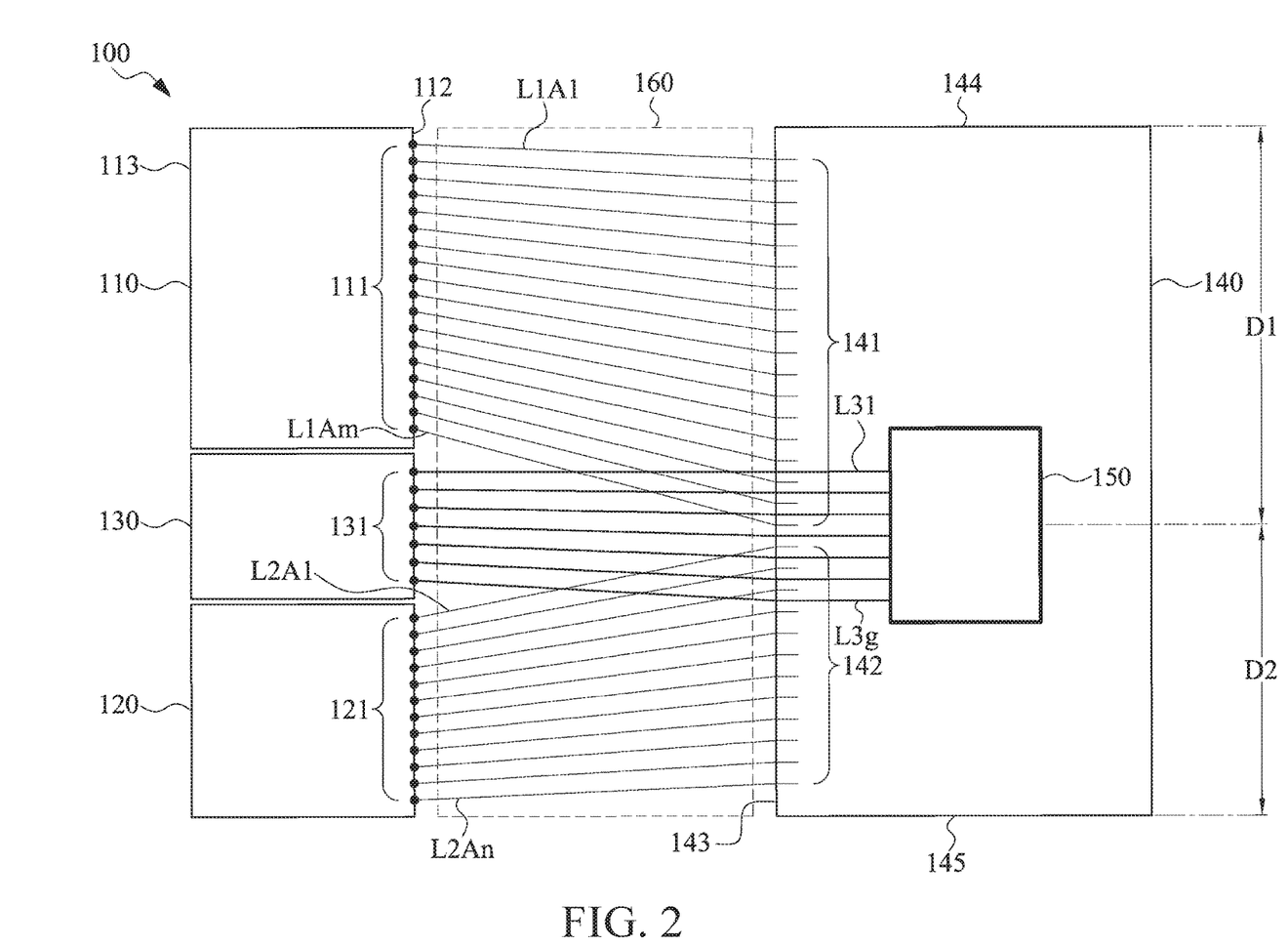
FIG. 2 is a schematic view of the display device according to some embodiments of the present disclosure.

In order to prevent the third driving circuit 130 from occupying additional frame space and increasing the overall thickness of the touch panel, in this disclosure, the third driving circuit 130 is arranged at the same level as the first driving circuit 110 and the second driving circuit 120, and the third driving circuit 130 is arranged between the first driving circuit 110 and the second driving circuit 120 so that the first driving circuit 110, the third driving circuit 130, and the second driving circuit 120 are sequentially arranged in parallel in the same direction, and is arranged adjacent to the first side 143 of the active display array 140 (reference is made to FIG. 2). That is to say, at the frame position where the gate driving circuit (i.e., the first driving circuit 110 and the second driving circuit 120) were originally provided, the fingerprint sensor driving circuit (i.e., the third driving circuit 130) is integrated to the same side of the frame and arranged between the first driving circuit 110 and the second driving circuit 120 in vertical direction so that the third driving circuit 130 will not increase the horizontal width of the frame.

The detail of the connecting line 160 is represented by the dotted area, and will be described in conjunction with FIG. 2 and FIG. 5 later. It shall be appreciated that, for simplification the drawings, the scan lines $S_1$~$S_{m+n}$ as shown in FIG. 1 is only a part of the active display array 140. The number of the scan lines varies according to the size of the active display array 140. Similarly, the number of the scan lines and the corresponding connection lines 160 coupled with them in subsequent drawings (such as FIG. 2 and FIG. 5) are only exemplary descriptions, and the number will be different depending on the size of the active display array 140, but not limited thereto.

FIG. 2 is a schematic view of the display device according to some embodiments of the present disclosure. The details of the connecting line 160 are further depicted in FIG. 2. The connecting lines that connect to the first driving circuit 110, the second driving circuit 120, and the third driving circuit 130 are represented as the reference characters L1A1~L1Am, L2A1~L2An, and L31~L3g respectively. However, as mentioned above, the number of the scan lines in the present disclosure is not limited thereto. In addition, in FIG. 1 to FIG. 5, only a portion of the first output ends 111, the second output ends 121, the third output ends 131, the first portion 141 of the scan lines, the second portion 142 of the scan lines, the connecting lines L1B1~L1Bm, the connecting lines L2B1~L2Bn, the bus lines 170, and the data lines DL are shown, but the number of the above-mentioned components is not limited to the number shown in the drawings.

Since the first driving circuit 110 and the second driving circuit 120 are separated by the third driving circuit 130, in some embodiments, the scan lines may be classified into two portions. The first portion 141 of the scan lines includes m scan lines coupled to the first driving circuit 110 through the first connecting lines L1A1~L1Am, and the second portion 142 of the scan lines includes n scan lines coupled to the second driving circuit 120 through the second connecting lines L2A1~L2An. In some embodiments, the first portions 141 of the scan lines are coupled to the corresponding first output ends 111 of the first driving circuit 110 through the first connecting lines L1A1~L1Am, and the second portions 142 of the scan lines are coupled to the corresponding second output ends 121 of the second driving circuit 120 through the second connection lines L2A1~L2An.

Further, to achieve narrow bezel, in some embodiments, the first driving circuit 110 and the second driving circuit 120 that are disposed on two sides of the active display array 140 must not extend beyond the top side 144 and the bottom side 145 of the active display array 140. Thus, the spacings between the output ends of the first driving circuit 110, the second driving circuit 120, and the third driving circuit 130 are compressed. In some embodiments, the first portion 141 of the scan lines, the second portion 142 of the scan lines, the first output ends 111, and the second output ends 121 are disposed with equal spacing.

In some embodiments, the active display array 140 has a top side 144 and a bottom side 145, and the distance D1 from the optical sensor array 150 to the top side 144 is greater than the distance D2 from the optical sensor array 150 to the bottom side 145. Accordingly, the number of first portion 141 (e.g., m scan lines), which is closer to the top side 144 and is driven by the first driving circuit 110, of scan lines is larger than the number of second portion 142 (e.g., n scan lines), which is closer to the bottom side 145 and is driven by the second driving circuit 120, of scan lines. In some embodiments, the third driving circuit 130 is disposed at a position corresponding to a position where the optical sensor array 150 is disposed in the active display array 140 (e.g., the two are aligned at the center, one of the two edges is aligned, etc.).

In some embodiments, the first driving circuit 110 has a second side 112 and a third side 113, the second side 112 is close to the first side 143 of the active display array 140, the first output end 111 of the first driving circuit 110 is disposed adjacent to the second side 112, and the third side 113 is disposed opposite to the second side 112. In other words, the first output end 111 is disposed on a side of the first driving circuit 110 closer to the active display array 140, and in one embodiment, the first output end 111 is disposed on the second side 112. Similarly, a side (not shown) of the second driving circuit 120 close to the first side 143 of the active display array 140, and the second output end 121 of the second driving circuit 120 is disposed adjacent to the side or disposed directly on the side.

Reference is made to FIG. 1. In some embodiments, the spacing between each scan line of the first portion 141 of the scan lines and each scan line of the second portion 142 of the scan lines of the active display array 140 is greater than the spacing between the first output ends 111 of the first driving circuit 110, and the spacing between the first output ends 111 of the first driving circuit 110 is greater than the spacing between the second output ends 121 of the second driving circuit 120. By means of the design, the purpose of the narrowest frame can be achieved. In other words, since the number of scan lines of the active display array 140 is fixed, the number of outputs of the first driving circuit 110 and the second driving circuit 120 that are correspondingly disposed is also fixed accordingly.

Under the condition that the distance between the first driving circuit 110 and the first side 143 and the distance between the second driving circuit 120 and the first side 143 are not changed, the spacing between the first output ends 111 of the first driving circuit 110 need to be enlarged (i.e., the number of the output ends 111 of the first driving circuit 110 is reduced), and the spacing between the second output ends 121 of the second driving circuit 120 need to be correspondingly reduced (i.e., the number of the second output ends 121 of the second driving circuit 120 is increased), so that the slopes of the first connecting lines L1Al~L1Am and the second connecting lines L2A1~L2An can be reduced. In this case, the situation that the slopes are too large is avoided, the connecting lines are parallel as much as possible, and the area of the diagonal connecting lines is minimized.

In some embodiments, in order that the longest length of the first driving circuit 110, the second driving circuit 120, and the third driving circuit 130 after being arranged side by side does not exceed the length of the first side of the active display array 140, the spacing between the plurality of output ends 131 in the third driving circuit 130 is also compressed, and the pitch between the plurality of second output ends 121 in the second driving circuit 120 is smaller than the pitch between the plurality of output ends 131 in the third driving circuit 130. In some embodiments, the spacing between the output ends 131 in the third driving circuit 130 is compressed in order to avoid that the longest length of the first driving circuit 110, the second driving circuit 120, and the third driving circuit 130 after being arranged side by side does not exceed the length of the first side of the active display array 140, and the spacing between the second output ends 121 in the second driving circuit 120 is smaller than the spacing between the output ends 131 in the third driving circuit 130.

In some embodiments, the first connecting lines L1A1~L1Am are disposed at the first metal layer (e.g., Metal 0), and are used to couple the first driving circuit 110 to the first portion 141 of the scan lines of the active display array 140; the second connecting lines L2A1~L2An are disposed at the first metal layer (e.g., Metal 0), and are used to couple the second driving circuit 120 to the first portion 142 of the scan lines of the active display array 140. Due to the limited length and width space between the driving circuit and the active display array, the third connecting lines L31~L3g that couple the third driving circuit 130 to the optical sensor array 150 are highly likely to overlap some of the connecting lines of the first connecting lines L1A1~L1Am and the second connecting lines L2A1~L2An. Therefore, in some embodiments, in order to enable the first driving circuit, second driving circuit, and the third driving circuit to drive components with different functions with independent signals, the third connecting lines L31~L3g are disposed at second metal layer (e.g., Metal 1) which is different from the aforementioned first metal layer (e.g., Metal 0). The third connecting lines L31~L3g couple the third driving circuit 130 to the optical sensor array 150 to prevent from sharing driving signals caused by using the same metal layer.

With the above arrangement, the distance between the first side 143 and the third side 113 of the display device shown in FIG. 1 can be less than 1 millimeter (mm).

Figure 3:
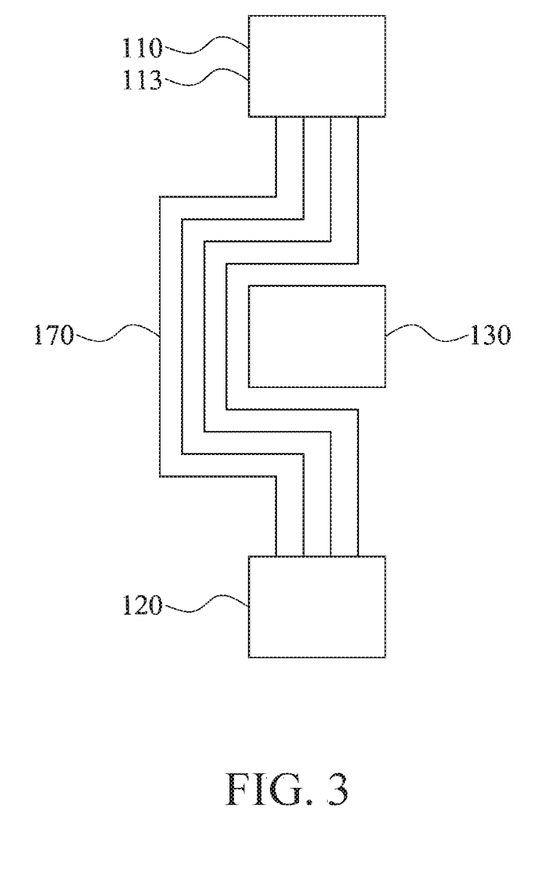
FIG. 3 is a schematic view of the connection of the bus lines of the driving circuits in the display device according to some embodiments of the present disclosure.

Reference is made to FIG. 3. FIG. 3 is a schematic view of the connection of the bus lines of the driving circuits in the display device according to some embodiments of the present disclosure. The first driving circuit 110 and the second driving circuit 120 share the bus lines 170. In order to prevent the position of the bus lines 170 from overlapping with the third driving circuit 130, in some embodiments, the bus lines 170 between the first driving circuit 110 and the second driving circuit 120 can bypass the third driving circuit 130 via a side close to the third side 113, as shown in FIG. 3. In some embodiments, to avoid signal interference, bus lines 170 are arranged at the third metal layer (e.g., Metal 2).

Figure 4:
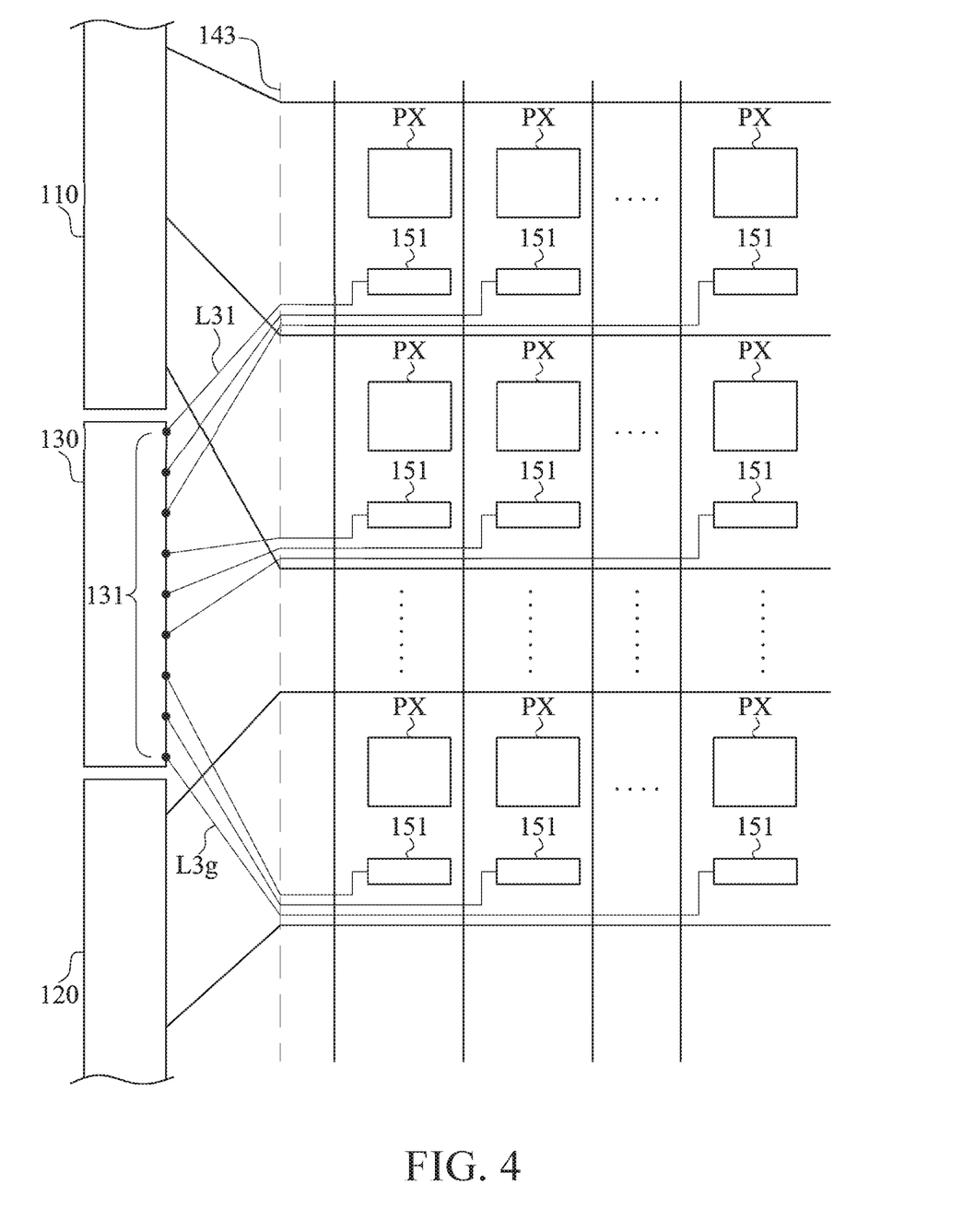
FIG. 4 is a local detail schematic view of the optical sensor array in the display device according to some embodiments of the present disclosure.

Reference is made to FIG. 4. FIG. 4 is a local detail schematic view of the optical sensor array 150 in the display device according to some embodiments of the present disclosure. It shall be appreciated that, the scan lines $S_1$~$S_m$ are coupled to the first driving circuit 110, and the scan lines $S_{m+1}$~$S_{m+n}$ are coupled to the second driving circuit 120, the connections thereof have been described above.

FIG. 4 only shows a part of the scan lines $S_1$~$S_m$+n, and the first driving circuit 110 and the second driving circuit 120 are represented by ellipsis, and the rest will not be further described. As shown in FIG. 4, the active display array 140 is composed of a plurality of pixels PX, and the optical sensor array 150 is composed of a plurality of optical sensing elements 151. To simplify the description of the drawings, the pixel PX represents each pixel, and the optical sensing element 151 represents each optical sensing element. There are a plurality of pixels PX of the active display array in the area where the optical sensor array 150 is located, the corresponding relationship between the pixels PX and the optical sensor element 151 can be one-to-one, one-to-many, many-to-one, or many-to-many. To simplify the description, the following describes the arrangement of one pixel corresponding to one optical sensor element as shown in FIG. 4 but the present disclosure is not limited thereto.

In FIG. 4, each pixel PX is arranged between two horizontal scan lines and two vertical data lines DL, and each optical sensor element 151 is also arranged between two horizontal scan lines and two vertical data lines. In this embodiment, the optical sensor element 151 can be arranged below the pixel PX or above the pixel PX. In some embodiments, the optical sensor element 151 is coupled to one of the third output ends 131 of the third driving circuit 140 via the connecting lines L31~L3g. The connecting lines L31~L3g are substantially perpendicular to the direction of the data lines DL in the active display array 140 (i.e., the inner part of the first side 143), and is coupled to one of the third output ends 131 outside the active display array 140 in diagonal direction and the shortest linear distance.

Figure 5:
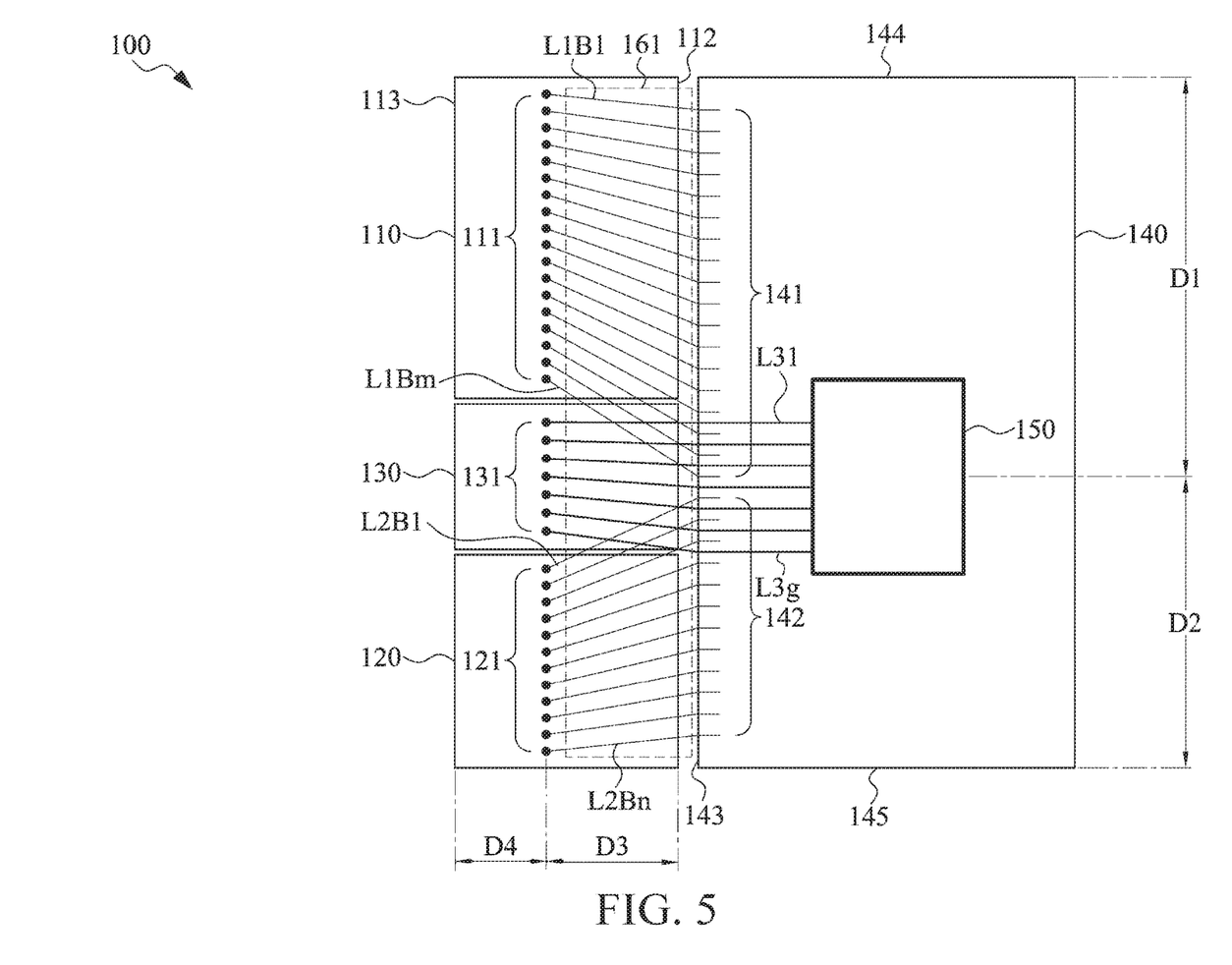
FIG. 5 is a schematic view of another display device according to another embodiment of the present disclosure.

Reference is made to FIG. 5. FIG. 5 is a schematic view of another display device according to another embodiment of the present disclosure. It shall be appreciated that, the display device 100 in FIG. 5 is substantially similar to the display device 100 in FIGS. 1 and 2 of the previous embodiments. Except for the elements and connection relationships mentioned in the following paragraphs, the rest are substantially the same as the display device 100 in FIGS. 1 and 2, and will not be further described herein.

The main difference is that the connecting line 161 of the display device 100 in FIG. 5 is different from the connecting line 160 of the display device 100 in FIG. 1 and FIG. 2. The first driving circuit of the display device 100 in FIG. 5 has a second side 112 and a third side 113 opposite to the second side 112. In some embodiments, the second side 112 of the first driving circuit 110 is adjacent to the first side 143 of the active display array 140, and the distance D3 between the first output end 111 of the first driving circuit 110 and the second side 112 is greater than the distance D4 between the first output end 111 and the third side 113. Similarly, the second driving circuit 120 also has two opposite sides (not shown). One side is adjacent to the first side 143 of the active display array 140, and the other side is opposite to the side which is adjacent to the first side 143. The distance between the second output end 121 and the side adjacent to the active display array is greater than the distance from the opposite side. In some embodiments, the side adjacent to the active display array 140 in the second driving circuit 120 is at the same side as the second side 112 of the first driving circuit 110, or further on the same straight line.

The connecting line 161 connects the first output end 111 and the second output end 121 to the first portion 141 of the scan lines and the second portion 142 of the scan lines, and connects the third output end 131 to the optical sensor array 150.

By changing the position of the first output end 111 and the second output end 121 from the side which is adjacent to the active display array 140 (e.g., close to the second side 112) to the side which is away from the active display array 140 (e.g., close to the third side 113), the distance between the first output end 111 and the scan lines and the distance between the second output end 121 and the scan lines can be lengthened. Accordingly, the space between the active display array 140 and the first driving circuit 110, the space between the active display array 140 and the second driving circuit 120, and the space between the active display array 140 and the third driving circuit 130 can be reduced, and thereby reducing the frame width. For example, the distance between the first side 143 and the third side 113 is less than 0.5 mm.

It shall be appreciated that, in FIG. 3 and FIG. 4, the arrangement of the output ends such as the first output end 111, the second output end 121, and the third output end 131 and the bus lines 170 can also apply to the display device 100 in FIG. 5, and thus will not be further described herein.

Based on the above descriptions, the display device provided by the present disclosure reduces the waste of the frame area, thereby achieving a display device with a narrow bezel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A display device, comprising:
an active display array which comprises a plurality of scan lines;
an optical sensor array overlapping the active display array;
a first driving circuit, being coupled to a first portion of the scan lines through a first metal layer;
a second driving circuit, being coupled to a second portion of the scan lines through the first metal layer; and
a third driving circuit, being disposed between the first driving circuit and the second driving circuit and being coupled to the optical sensor array through a second metal layer, wherein the second metal layer is different from the first metal layer.

2. The display device of claim 1, wherein
the active display array has a first side, and the first driving circuit, the third driving circuit, and
the second driving circuit are arranged adjacent to the first side of the active display array, and the first driving circuit, the third driving circuit, and the second driving circuit are arranged in sequence at the first side and are substantially parallel with each other.

3. The display device of claim 1, wherein a position of the third driving circuit corresponds to a position of the optical sensor array.

4. The display device of claim 1, wherein the active display array has a top side and a bottom side, and a first distance from the optical sensor array to the top side is greater than a second distance from the optical sensor array to the bottom side.

5. The display device of claim 1, wherein the first driving circuit is coupled to and configured to drive m scan lines of the scan lines, and the second driving circuit is coupled to and configured to drive n scan lines of the scan lines, wherein m and n are positive integers, and m>n.

6. The display device of claim 1, further comprising a plurality of first connecting lines, a plurality of second connecting lines, and a plurality of third connecting lines, wherein the first connecting lines are disposed on the first metal layer, two ends of the first connecting lines are connected to a plurality of first output ends of the first driving circuit and the first portion of the scan lines, the second connecting lines are disposed on the first metal layer, two ends of the second connecting lines are connected to a plurality of second output ends of the second driving circuit and the second portion of the scan lines, and the third connecting lines are disposed on the second metal layer, two ends of the third connecting lines are connected to a plurality of third output ends of the third driving circuit and the optical sensor array.

7. The display device of claim 6, wherein the first driving circuit has a first side which is close to a first side of the active display array, and the first output ends of the first driving circuit are adjacently arranged on the first side of the first driving circuit.

8. The display device of claim 6, wherein the first driving circuit has a first side and a second side, the second side of the first driving circuit is opposite to the first side of the first driving circuit, the first side of the first driving circuit is adjacent to a first side of the active display array, and a third distance from the first output ends of the first driving circuit to the first side of the first driving circuit is greater than a fourth distance from the first output ends to the second side of the first driving circuit.

9. The display device of claim 1, further comprising a plurality of bus lines, wherein the bus lines are coupled to the first driving circuit, the second driving circuit, and the third driving circuit at a third metal layer.

\* \* \* \* \*